United States Patent
Rodriguez Bravo et al.

(10) Patent No.: US 11,531,849 B2
(45) Date of Patent: Dec. 20, 2022

(54) DEVICE MANAGEMENT SYSTEM

(71) Applicant: International Business Machines Corporation, Armonk, NY (US)

(72) Inventors: Cesar Augusto Rodriguez Bravo, Alajuela (CR); Aaron K. Baughman, Cary, NC (US); Sarbajit K. Rakshit, Kolkata (IN); Craig M. Trim, Ventura, CA (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 16/393,934

(22) Filed: Apr. 24, 2019

(65) Prior Publication Data
US 2020/0342269 A1 Oct. 29, 2020

(51) Int. Cl.
*G06K 9/62* (2022.01)
*G06F 17/15* (2006.01)
*G06F 3/01* (2006.01)

(52) U.S. Cl.
CPC ............ *G06K 9/6264* (2013.01); *G06F 3/01* (2013.01); *G06F 17/15* (2013.01); *G06K 9/6255* (2013.01)

(58) Field of Classification Search
CPC ...... G06K 9/6264; G06K 9/6255; G06F 3/01; G06F 17/15
See application file for complete search history.

(56) References Cited

U.S. PATENT DOCUMENTS

| 8,452,797 | B1 | 5/2013 | Paleja et al. |
| 2016/0091540 | A1 | 3/2016 | Marti et al. |
| 2017/0061351 | A1* | 3/2017 | Lee .................. G06Q 10/20 |
| 2021/0318180 | A1* | 10/2021 | Huang ................. G01K 3/005 |

FOREIGN PATENT DOCUMENTS

| CN | 102611730 A | 7/2012 |
| WO | WO2015006312 A2 | 1/2015 |

* cited by examiner

*Primary Examiner* — David F Dunphy
(74) *Attorney, Agent, or Firm* — Yee & Associates, P.C.

(57) ABSTRACT

A method, apparatus, computer system, and computer program product for managing a device. The method detects, by a computer system, a physical handling of the device to form a physical handling pattern for the device. The method determines, by the computer system, a baseline physical handling pattern for the device, wherein the baseline physical handling pattern for the device meets a set of handling metrics for the device. The method initiates, by the computer system, a set of actions in response to the physical handling pattern for the device deviating from the baseline physical handling pattern for the device.

20 Claims, 5 Drawing Sheets

DEVICE MANAGEMENT SYSTEM

BACKGROUND

1. Field

The present disclosure relates generally to an improved computer system and more specifically to a method, apparatus, computer system, and computer program product for managing devices based on detected handling of the devices.

2. Description of the Related Art

An Internet of Things (IoT) is a system of devices containing computing capability to transfer data over a network. The devices are referred to as smart devices. This transfer of data by these smart devices occurs without requiring human to human or human to computer interaction. These smart devices that form the Internet of Things can be remotely monitored, remotely controlled, or both remotely monitored and remotely controlled. Smart devices include, for example, thermostats, security systems, cameras, smart speakers, smart phones, smart refrigerators, and other suitable devices.

The Internet of Things can be an extension of the Internet, an ad hoc network, or some other suitable type of network. The communications can be provided using wireless connections, wired connections, optical connections, or some combination thereof.

The Internet of Things can be used in many types of applications. For example, the Internet of Things can provide improvements in automation and security. As another example, the Internet of Things when implemented in automobiles can provide for improved traffic management, autonomous driving, and other vehicle related uses. In yet another example, the Internet of Things can be applied to the agriculture. With the collection of data on parameters such as temperature, rainfall, humidity, wind speed, pest infestation, soil content, and other parameters, farming techniques can be automated in a manner that improves the quality and quantity of crops while reducing risk and waste in managing the crops.

SUMMARY

According to one embodiment of the present invention, a method manages a device. The method detects, by a computer system, a physical handling of the device to form a physical handling pattern for the device. The method determines, by the computer system, a baseline physical handling pattern for the device. The baseline physical handling pattern for the device meets a set of handling metrics for the device. The method initiates, by the computer system, a set of actions in response to the physical handling pattern for the device deviating from the baseline physical handling pattern for the device.

According to another embodiment of the present invention, a device management system comprises a computer system. The computer detects a physical handling of a device to form a physical handling pattern for the device and determines a baseline physical handling pattern for the device. The baseline physical handling pattern for the device meets handling metrics for the device. The computer system initiates a set of actions in response to the physical handling pattern for the device deviating from the baseline physical handling pattern for the device.

According to yet another embodiment of the present invention, a computer program product for managing a device comprises a computer-readable-storage media with first program code, second program code, and third program code stored on the computer-readable storage media. The first program code is executed to detect a physical handling of the device to form a physical handling pattern for the device. The second program code is executed to determining a baseline physical handling pattern for the device. The baseline physical handling pattern for the device meets handling metrics for the device. The third program code is executed to initiate a set of actions in response to the physical handling pattern for the device deviating from the baseline physical handling pattern for the device.

DETAILED DESCRIPTION

Figure 1:
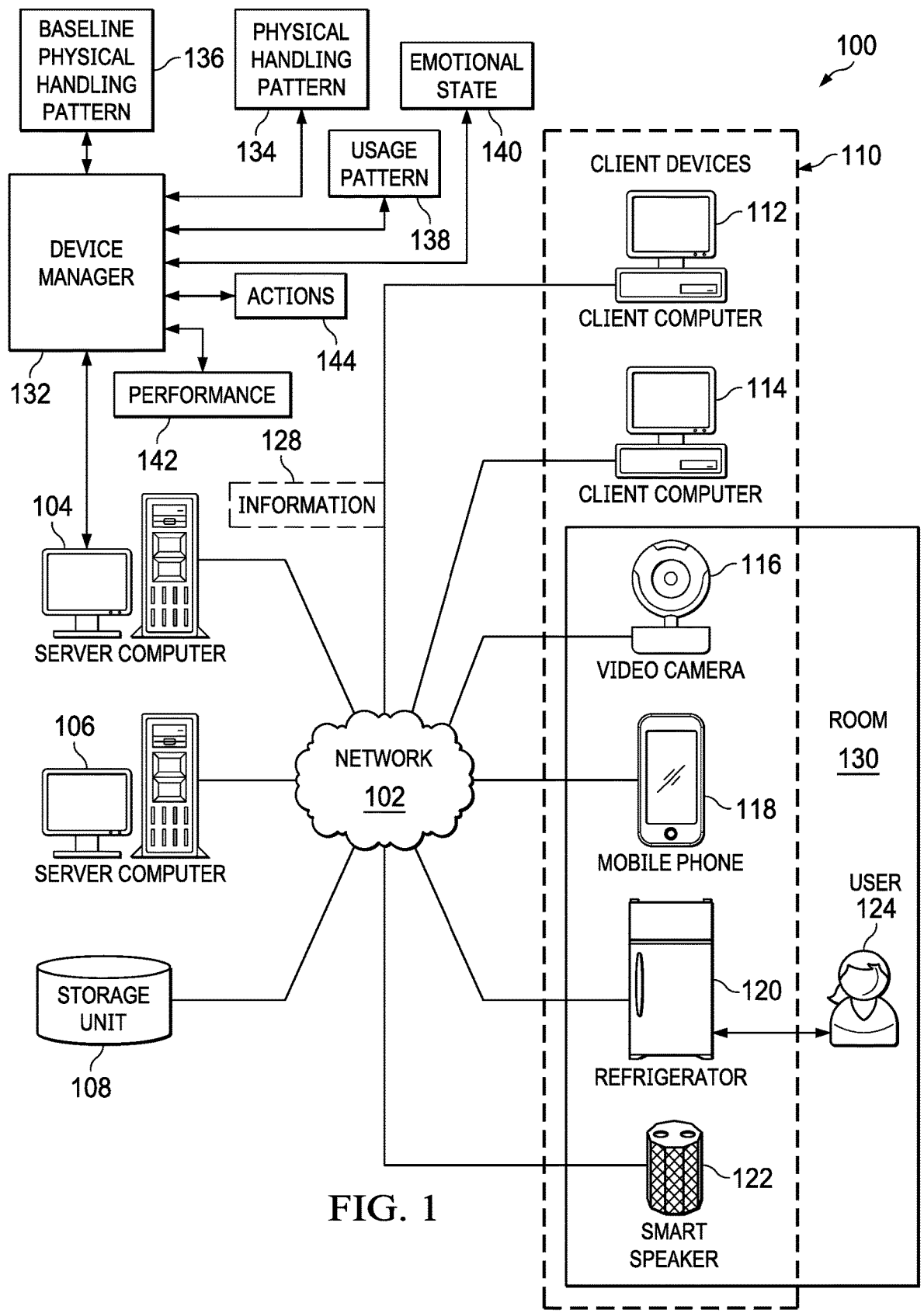
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The illustrative embodiments recognize and take into account one or more considerations. For example, the illustrative embodiments recognize and take into account that a network of smart devices can be used to monitor the physical handling of those or other devices. For example, the illustrative embodiments recognize and take into account that the network of smart devices can be used to monitor the physical handling of devices that may not be connected to a network.

The illustrative embodiments recognize and take into account that it would be desirable to have a method, an apparatus, a computer system, and a computer program product that tracks the physical handling devices in a manner that enables taking actions with respect to those devices. For example, the illustrative embodiments recognize and take into account that when undesired physical handling of a device occurs, an action can be initiated to change the physical handling of the device, such as scheduling maintenance for the device, suggesting a replacement for the device, or other suitable actions.

The illustrative embodiments provide a method, an apparatus, a computer system, and a computer program product for managing a device. In one illustrative example, the process monitors a physical handling of a device to form a physical handling pattern for the device. The process determines a baseline physical handling pattern for the device, wherein the baseline physical handling pattern for the device meets a set of handling metrics for the device. The process initiates a set of actions in response to the physical handling pattern for the device deviating from the baseline physical handling pattern for the device.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and video camera 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, refrigerator 120, and smart speaker 122. In this illustrative example, server computer 104, server computer 106, storage unit 108, and client devices 110 are network devices that connect to network 102 in which network 102 is the communications media for these network devices. Some or all of client devices 110 may form an Internet of Things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, video camera 116, mobile phone 118, refrigerator 120, and smart speaker 122 are client devices 110 located in room 130. Room 130 can be located in a house, an office, or some other the location. As depicted, these client devices form an Internet of Things (IoT) and are also referred to as smart devices. A smart device is a device that includes the capability to perform at least one of information generation or information processing.

For example, video camera 116 can generate video data. Mobile phone 118 can generate video data, audio data, positioning information, acceleration data, or other suitable types of information. In this illustrative example, refrigerator 120 can generate information about the contents in refrigerator 120, a position of refrigerator 120, a movement of refrigerator 120, an opening of a door for refrigerator 120, a closing of a door for refrigerator 120, an opening of a bin in refrigerator 120, a closing of the bin in refrigerator 120, acceleration data, or other suitable information. Smart speaker 122 can generate information such as audio data.

In this illustrative example, client devices 110 in room 130 can send and receive information 128 through connections to network 102. These connections can be selected from at least one of a wireless connection, a wired connection, an optical connection, or some other suitable connection for transmitting or receiving information 128.

As depicted, device manager 132 is located in server computer 104. Device manager 132 receives information 128 sent by at least one of video camera 116, mobile phone 118, refrigerator 120, or smart speaker 122. Device manager 132 uses information 128 to manage refrigerator 120 in this illustrative example.

Device manager 132 can use information 128 received from client devices 110 located in room 130 to determine at least one of physical handling pattern 134, usage pattern 138, or emotional state of user 124 with respect to refrigerator 120. These determinations can be made for use in managing refrigerator 120.

For example, physical handling pattern 134 can be the force applied by user when closing a door for refrigerator 120. In another illustrative example, physical handling pattern 134 can be the frequency at which the door for refrigerator 120 is closed and the force applied by user 124 when closing the door for refrigerator 120. In this depicted example, the closing of the door over time can be determined by information 128 from at least one of refrigerator 120, video data generated by video camera 116, or video data generated by mobile phone 118.

For example, the force can be determined from information 128 received from refrigerator 120. This information can be, for example, accelerometer data for the door. As another example, the force in closing the door can be determined from information 128 received from video camera 116 in which video data of the closing of the door by user 124 can be used to determine the change in speed at which the door closes. The change in speed and motions of user 124 along with information about the door, such as the mass of the door, can be used to estimate the force used to close the door. Physical handling pattern 134 for refrigerator 120 can be referred to as a detected physical handling pattern.

As depicted, device manager 132 compares physical handling pattern 134 to baseline physical handling pattern 136. In this illustrative example, baseline physical handling pattern 136 can define a proper amount of force that should be used to close the door. This proper amount of force can be based on handling a set of metrics for refrigerator 120 for an expected life of refrigerator 120. The set of handling metrics can define a threshold of force that when exceeded can result in a failure of the door sooner than expected. For example, a pattern for force exceeding the threshold can cause the door to weaken and the hinges to loosen. This pattern can also cause the seal for the door to lose effectiveness in maintaining an airtight contact sooner than expected.

In response to detecting that physical handling pattern 134 deviates from baseline physical handling pattern 136, device manager 132 can initiate a number of actions 144. In this illustrative example, the deviation can be if the difference is greater than some threshold value or range of values.

The number of actions 144 initiated by device manager 132 can take one or more of different forms. For example, device manager 132 can cause a message to be displayed on a display device in refrigerator 120 that suggests reducing the force used to close the door. As another example, the suggestion to reduce the force used to close the door can be presented as an audio message by smart speaker 122.

Other actions in actions 144 can include at least one of suggesting maintenance for refrigerator 120. The maintenance can include inspecting a door, seals, and hinges. Replacement can occur as needed. The other actions in actions 144 can also include recording physical handling pattern 134 to create a history, voiding a warranty if physical handling pattern 134 indicates abusive handling of refrigerator 120, or other suitable actions.

Further, determinations of usage pattern 138 or emotional state 140 can be used when analyzing physical handling pattern 134. This analysis can be an example of an action in actions 144.

In the illustrative example, emotional state 140 for physical handling pattern 134 can be used by device manager 132 to determine if user frustration is present. This user frustration can be used to determine whether further diagnostic tests may be needed for refrigerator 120. User frustration can occur from the door not closing properly to form a seal. For example, the door may not close to form the seal when a force greater than the force defined in baseline physical handling pattern 136 is used to close the door at a frequency greater than specified in baseline physical handling pattern 136.

As another example, frustration may be present because of a failure of a feature to work properly in refrigerator 120. For example, user 124 may request instant chilling in which chilling occurs, but does not stop before causing items to freeze within refrigerator 120. A detection of frustration in emotional state 140 with physical handling pattern 134 deviating from baseline physical handling pattern 136 can result in running further diagnostics that detect the issue with the chilling feature for refrigerator 120.

As another example, an action in actions 144 can include examining usage pattern 138 of the chilling feature when physical handling pattern 134 deviates from baseline physical handling pattern 136 to determine that user 124 has reduced the use of this feature. Device manager 132 can determine that the reduction in use results from user 124 not knowing how to use the feature. In this case, device manager 132 can initiate an action that suggests a video on how to use the chilling feature or presents step-by-step audio instructions for using the chilling feature.

In this manner, devices such as refrigerator 120 can be managed in a manner that can increase the usability of refrigerator 120 by user 124. Further, refrigerator 120 can be managed in a manner that reduces the amount of maintenance, increases the longevity, reduces the need for replacement, or some combination thereof.

This illustrative example is not meant to limit the manner in which other examples can be implemented. For example, device manager 132 can be used to manage other devices in room 130 or in other locations. For example, device manager 132 can also monitor the use of mobile phone 118. In other examples, device manager 132 can run other data processing systems other than server computer 104. For example, device manager 132 can also run on client computer 112, mobile phone 118, or other suitable data processing systems.

Figure 2:
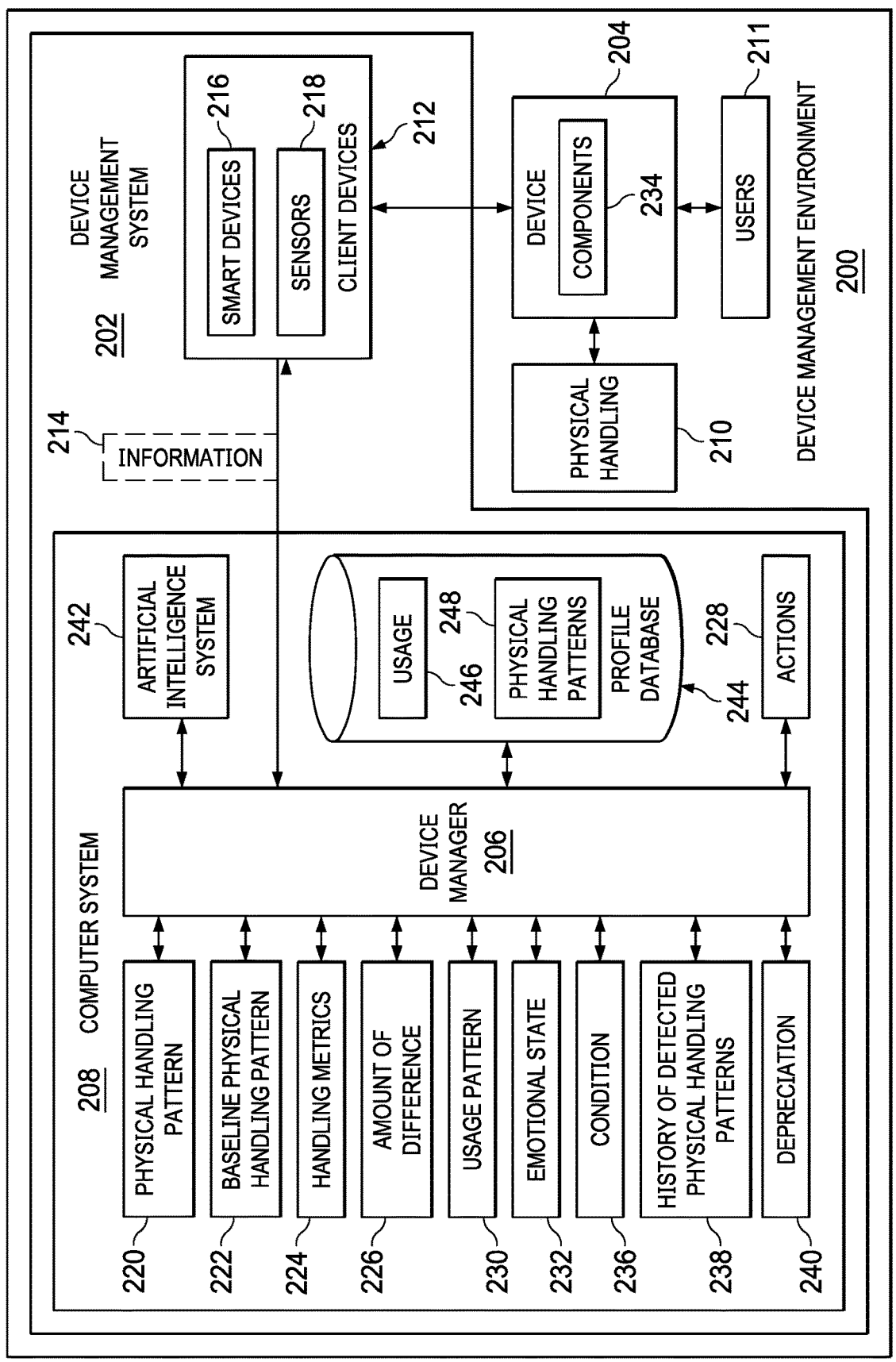
FIG. 2 is a block diagram of a device management environment in accordance with an illustrative embodiment.

With reference now to FIG. 2, a block diagram of a device management environment is depicted in accordance with an illustrative embodiment. In this illustrative example, device management environment 200 includes components that can be implemented in hardware such as the hardware shown in network data processing system 100 in FIG. 1.

In this illustrative example, device management system 202 in device management environment 200 operates to manage device 204. Device 204 can take a number of different forms. For example, device 204 can be selected from a client device, a smart device, an appliance, a refrigerator, a dishwasher, a microwave, an oven, a freezer, a clothes washer, a clothes dryer, a digital photo frame, a television, a clock, a fan, a thermostat, a toaster, a game console, a mobile phone, a tablet computer, a laptop computer, a camera, an air conditioner, and an automobile.

In the illustrative examples, device 204 does not necessarily take the form of a client device or a smart device. In some illustrative examples, device 204 can be a device such as a refrigerator that does not have data processing capabilities or connectivity to a network or component for processing information. This type of device can still be managed by device manager 206 with client devices 212.

In this illustrative example, device management system 202 comprises device manager 206 in computer system 208 and client devices 212. Device manager 206 can be implemented in software, hardware, firmware, or a combination thereof. When software is used, the operations performed by device manager 206 can be implemented in program code configured to run on hardware, such as a processor unit. When firmware is used, the operations performed by device manager 206 can be implemented in program code and data and stored in persistent memory to run on a processor unit. When hardware is employed, the hardware may include circuits that operate to perform the operations in device manager 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform a number of operations. The device can be reconfigured at a later time or can be permanently configured to perform a number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 208 is a physical hardware system and includes one or more data processing systems. When more than one data processing system is present in computer system 208, those data processing systems are in communication with each other using a communications medium. The communications medium can be a network. The data processing systems can be selected from at least one of a computer, a server computer, a tablet computer, or some other suitable data processing system.

In this illustrative example, physical handling 210 by a set of users 211 can be detected by a group of client devices 212 in device management system 202. Client devices 110 in FIG. 1 are some nonlimiting examples of implementations for the group of client devices 212 shown in block form in this figure. As used herein, a "group of" when used with reference to items, means one or more items. For example, a "group of client devices 212" is one or more of client devices 212.

In this illustrative example, a client device in the group of client devices 212 can generate information 214. A client device in the group of client devices 212 can include components such as a processor, an application specific integrated circuit (ASIC), a programmable logic device (PLD), or other electrical circuit that can generate information 214. Further, a client device also can include one or more sensors to generate information 214. In this illustrative example, client devices 212 can generate information 214 and can also be referred to as smart devices 216.

In this illustrative example, device 204 is shown as a separate device from the group of client devices 212. In some illustrative examples, device 204 can be considered part of the group of client devices 212 and generate information 214.

In this illustrative example, a group of sensors 218 in the group of client devices 212 can generate information 214. For example, accelerometers in the group of sensors 218 can generate acceleration data for information 214. Information 214 is received by device manager 206 and processed to determine force.

In some illustrative examples, the group of sensors 218 generates sensor data that is processed in the group of client devices 212 to generate information 214. For example, sensor data can be processed to remove noise or identify parameters that are calculated from the sensor data. In one illustrative example, a client device in the group of client devices 212 can process the acceleration data to determine force that is sent in information 214 to device manager 206.

In this illustrative example, the group of client devices 212 sends information 214 that is used to determine physical handling 210 of device 204 to device manager 206. In the illustrative example, information 214 is sent by the group of client devices 212 with user consent. For example, user consent can be requested in an electronic form that the user can accept or reject. This and other data collection are performed from devices with user consent in the different illustrative examples described herein. Further, the consent can also be withdrawn at any time based on the request of a user.

In the illustrative examples, the group of client devices 212 can optionally provide notifications when information 214 is sent to device manager 206. For example, each client device can send a notification to notify a user each time information 214 is collected and sent by a client device. This notification can be a message such as an email message or a text message. Further, the notification also can include a pop-up message on a smart phone or a smart watch.

As depicted, device manager 206 analyzes physical handling 210 of device 204 to determine physical handling pattern 220 for device 204 from information 214. The analysis of physical handling 210 of device 204 can be performed to determine physical handling pattern 220. Patterns in physical handling 210 can be identified as physical actions performed on device 204 that repeat over time. The analysis can be performed for physical handling 210 over time to determine physical handling pattern 220.

As depicted, physical handling pattern 220 is a set of repeated actions taken by a user to physically handle device 204. These repeated actions of handling device 204 can be over a period of time. For example, physical handling pattern 220 can be a user closing a door for a refrigerator with a force of 70 newtons five times a day on Monday, Tuesday, Thursday, and Saturday each week. In another example, physical handling pattern 220 can be a user swimming two hours on Thursday and one hour on Friday on a weekly basis.

These patterns can be determined from information 214 by device manager 206 using artificial intelligence system 242. In this illustrative example, artificial intelligence system 242 is a system that has intelligent behavior and can be based on function of a human brain. An artificial intelligence system comprises at least one of an artificial neural network, a cognitive system, a Bayesian network, a fuzzy logic, an expert system, a natural language system, a cognitive system, or some other suitable system. Machine learning is used to train the artificial intelligence system. Machine learning involves inputting data to the process and allowing the process to adjust and improve the function of the artificial intelligence system. A cognitive system is a computing system that mimics the function of a human brain.

In this depicted example, artificial intelligence system 242 can be trained using machine learning processes to perform pattern recognition as well as other types of analysis. Artificial intelligence system 242 can be accessed by device manager 206 or can be implemented as part of device manager 206.

Further, device manager 206 determines baseline physical handling pattern 222 for device 204. Baseline physical handling pattern 222 can be located in a database, a table, a flat file, or in some other suitable data structure.

In this illustrative example, baseline physical handling pattern 222 meets a set of handling metrics 224 for device 204. In this illustrative example, handling metrics 224 can be determined using specifications or guides from a manufacturer of device 204. In other illustrative examples, handling metrics 224 can be determined by a third-party evaluating device 204.

In this illustrative example, baseline physical handling pattern 222 can be the expected physical handling of device 204. The set of handling metrics 224 can include metrics for the handling of device 204 as a whole or for one or more components in device 204. The set of handling metrics 224 can include, for example, at least one of force, frequency of use, environmental exposure, or other suitable metrics. These metrics can be used to identify physical handling patterns as baseline physical handling pattern 222 and physical handling pattern 220. The environmental exposure occurring from physical handling of device 204 can include at least one of temperature, humidity, moisture, or other suitable environmental parameters. For example, moisture can occur condensation or from water or other liquids being spilled or placed on device 204 by a user or users. As another example, moisture can occur from physical handling that immerses device 204 in water or another liquid. Additional illustrative examples of handling metrics 224 include the force used in closing a refrigerator door; a force applied in moving a surveillance camera; a hit to a surveillance camera, a level of pressure applied to a button for a device, and a level of pressure applied on a touch screen.

The force used in closing a refrigerator door can be determined using an accelerometer. This force can be used with a specification that sets out the forces for a normal closing of the refrigerator door to determine whether the refrigerator door is being closed normally or if the refrigerator door is being slammed in an undesired manner. In another example, the force used in moving an angle of a surveillance camera can be determined with an accelerometer. Further, this force can also be used to determine whether the surveillance camera is being hit instead of being gently moved. The heating can indicate that a mechanism in the surveillance camera is jammed or lacks lubrication.

In this illustrative example, device manager 206 compares physical handling pattern 220 for device 204 with baseline physical handling pattern 222 for device 204. Device manager 206 determines whether physical handling pattern 220 for device 204 deviates from baseline physical handling pattern 222 for device 204 based on amount of difference 226 between physical handling pattern 220 for device 204 and baseline physical handling pattern 222 for device 204. Amount of difference 226 can be any difference when an exact match is not present between handling metrics 224 in some examples. In yet another illustrative example, amount of difference 226 can be when a handling metric for handling device 204 in physical handling pattern 220 is greater than the threshold value for that measure in baseline physical handling pattern 222. In other illustrative examples, amount of difference 226 can be based on some threshold value that takes into account error, statistical, user inputs, a manufacturer predetermined threshold, a standard deviation, crowd source data from other device users, or other suitable sources or standards.

As depicted, device manager 206 determines a set of actions 228 in response to physical handling pattern 220 for device 204 deviating from baseline physical handling pattern 222 for device 204. For example, the set of actions 228 can be determined based on amount of difference 226 between physical handling pattern 220 for device 204 and baseline physical handling pattern 222 for device 204 and at least one of usage pattern 230 for device 204 or emotional state 232 with respect to device 204.

The set of actions 228 can take a number of different forms. For example, the set of actions 228 can comprise suggesting at least one of obtaining a replacement device, performing maintenance for device 204, a first set of changes in physical handling 210 of device 204 that increases at least one of a lifespan of device 204, a second set of changes in physical handling 210 of device 204 that increases a performance of device 204, or some other action with respect to device 204. Device manager 206 initiates the set of actions 228 in response to physical handling pattern 220 for device 204 deviating from baseline physical handling pattern 222 for device 204.

In the illustrative example, device manager 206 can track usage patterns 230 for each of users 211 who use device 204. As depicted, device manager 206 can maintain profile database 244 for each of users 211. Usage 246 of device 204 by each of users 211 can be recorded in user profiles for users 211 in profile database 244. This usage can be actual usage data and can also include physical handling patterns 248 that are associated with users 211. The usage by users 211 can be identified from information 214 in a number of different ways. For example, the device usage by a particular user can be performed by detecting a proximity of a user from device 204. This proximity can be based on wearable devices. As another example, image recognition can be used to identify which of users 211 handle device 204.

In the illustrative example, device manager 206 can predict at least one of when a set of components 234 in device 204 should be replaced or when device 204 should be replaced based on physical handling 210 detected for device 204. In yet another illustrative example, device manager 206 can determine condition 236 of device 204 for resell based on a history of physical handling patterns 238 for device 204 or depreciation 240 of device 204 based on history of physical handling patterns 238 for device 204.

Computer system 208 can be configured to perform at least one of the steps, operations, or actions described in the different illustrative examples using software, hardware, firmware or a combination thereof. As a result, computer system 208 operates as a special purpose computer system in which device manager 206 in computer system 208 enables managing a device based on the physical handling of device. In particular, device manager 206 transforms computer system 208 into a special purpose computer system as compared to currently available general computer systems that do not have device manager 206.

In the illustrative example, the use of device manager 206 in computer system 208 integrates processes into a practical application for managing a device that increases the performance of computer system 208. In other words, device manager 206 in computer system 208 is directed to a practical application of processes integrated into device manager 206 in computer system 208 that detects a physical handling of a device over time to identify a physical handling pattern for the device. This practical application also includes determining whether the physical handling pattern deviates from the baseline physical handling pattern such that an action should be initiated for the device. In this illustrative example, device manager 206 in computer system 208 can perform actions that that results in improvement in at least one of a satisfaction of a user using the device, increase performance for the device, increase longevity for the device, or other suitable metrics. In this manner, device manager 206 in computer system 208 provides a practical application of invention in managing devices such that the functioning of these devices is improved using computer system 208.

The illustration of device management environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, when device 204 is a client device or a smart device, device 204 can also include one or more sensors in sensors 218. Further, client devices 212 can also monitor physical handling 210 of other devices in addition to or in place of device 204.

Figure 3:
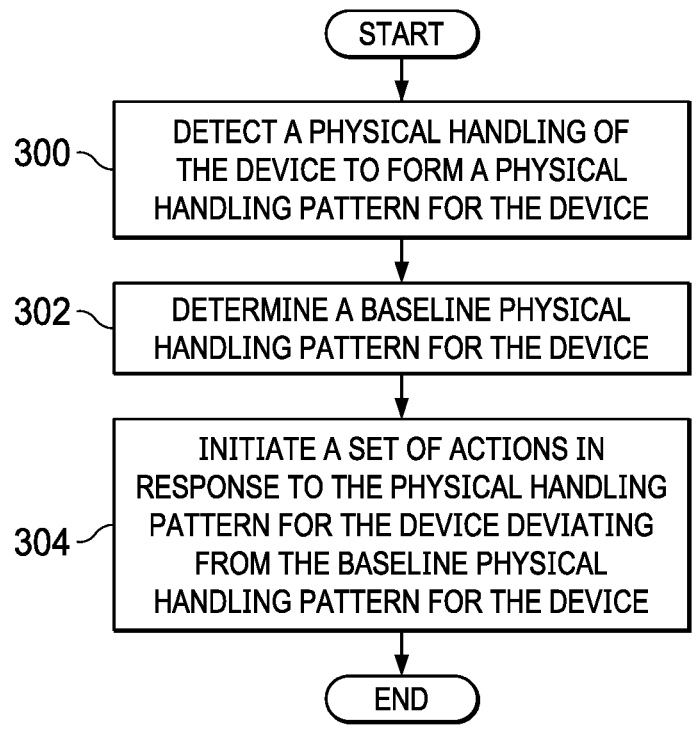
FIG. 3 is a flowchart of a process for managing a device in accordance with an illustrative embodiment.

Turning next to FIG. 3, a flowchart of a process for managing a device is depicted in accordance with an illustrative embodiment. The process in FIG. 3 can be implemented in hardware, software, or both. When implemented in software, the process can take the form of program code that is run by one of more processor units located in one or more hardware devices in one or more computer systems. For example, the process can be implemented in device manager 206 in computer system 208 in FIG. 2.

The process begins by detecting a physical handling of a device to form a physical handling pattern for the device (step 300). In this illustrative example, the physical handling of the device can be detected based on information received from client devices that will monitor the device being managed.

The process determines a baseline physical handling pattern for the device (step 302). In step 302, the baseline physical handling pattern for the device meets a set of handling metrics for the device.

The process initiates a set of actions in response to the physical handling pattern for the device deviating from the baseline physical handling pattern for the device (step 304). The process terminates thereafter.

Figure 4:
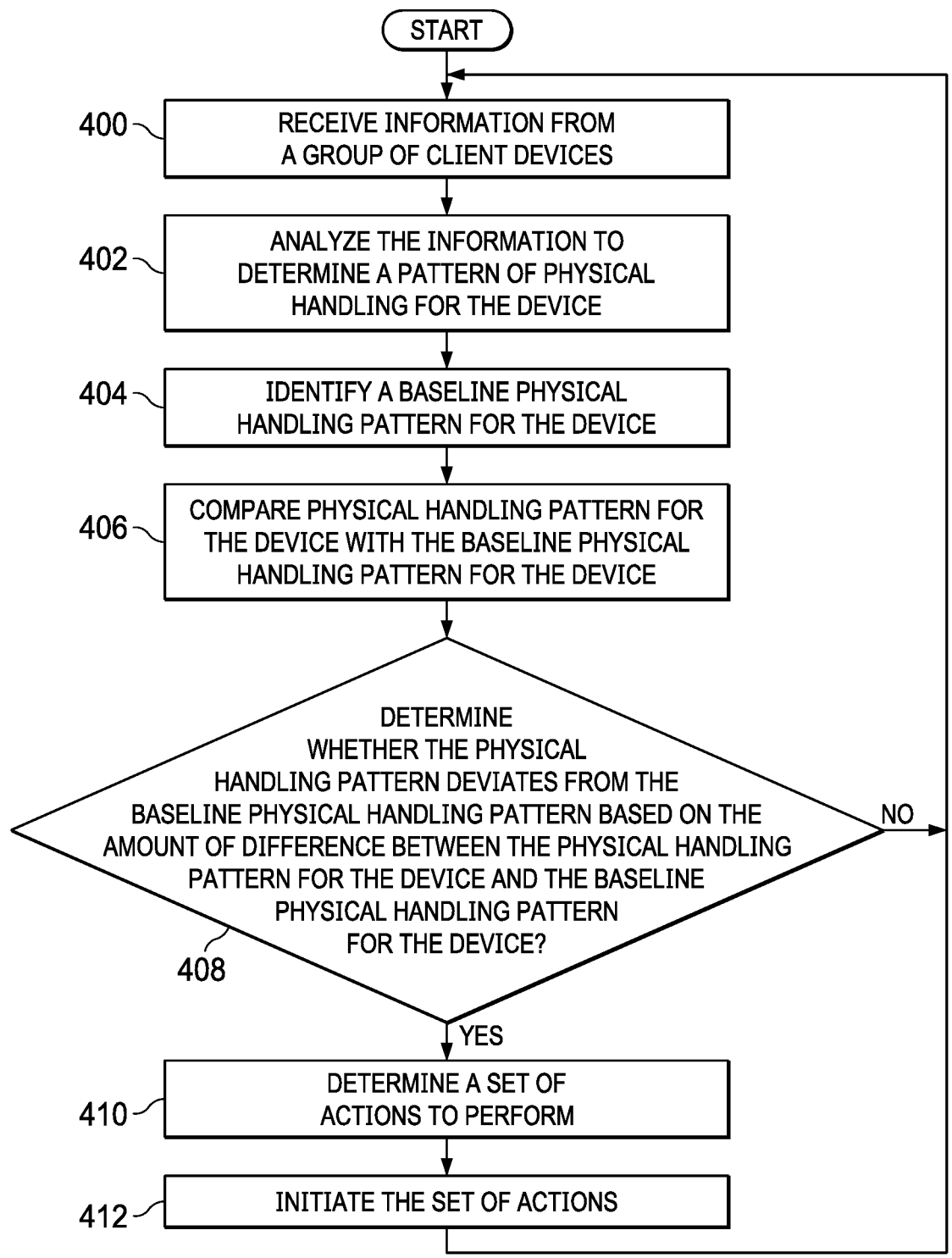
FIG. 4 is a more detailed flowchart of a process for managing a device in accordance with an illustrative embodiment.

With reference next to FIG. 4, a more detailed flowchart of a process for managing a device is depicted in accordance with an illustrative embodiment. The process in FIG. 4 can be implemented in hardware, software, or both. When implemented in software, the process can take the form of program code that is run by one of more processor units located in one or more hardware devices in one or more computer systems. For example, the process can be implemented in device manager 206 in computer system 208 in FIG. 2.

The process begins by receiving information from a group of client devices (step 400). The information can be at least one of sensor data or information derived from the sensor data by the group of client devices. The sensor data can include at least one of images, video, audio, acceleration data for a device, acceleration data for a component of a device, force applied to a device, force applied to a component of a device, location of a device, location of a component of a device, or other suitable information. The information can include information about the environment around the device. For example, the information can include at least one of noise, weather conditions, users present, or other information.

The process analyzes the information to determine a pattern of physical handling for the device (step 402). Physical handling, such as actions taken with respect to the device, can be identified from the information. For example, video data can be used to identify a particular user handling the device. The video data can show, for example, the user closing a refrigerator door. This information can be analyzed in an artificial intelligence system trained to detect patterns. The artificial intelligence system can determine a pattern of physical handling information received from the group of client devices.

For example, a user may have a physical handling pattern. Further, a detected physical handling can form a physical handling pattern that includes the physical handling performed by multiple users.

The process then identifies a baseline physical handling pattern for the device (step 404). The process compares the physical handling pattern for the device with the baseline physical handling pattern for the device (step 406).

A determination is made as to whether the physical handling pattern deviates from the baseline physical handling pattern based on an amount of difference between the physical handling pattern for the device and the baseline physical handling pattern for the device (step 408). In step 408, whether the deviation is present can be based on how much difference is present between these two physical handling patterns. For example, deviation can be considered to be present if any difference is present in one or more handling metrics. In other illustrative examples, the amount of difference can be a threshold for the handling metrics that take into account errors in measurements in the sensor data, differences in the frequency, force, or both at which a particular physical action, such as closing or opening of a refrigerator door occurs, or other factors.

For example, a user may open a refrigerator door three times a day with a force of 65.2 newtons, Monday through Thursday, and four times a times a day with a force of 66.9 newtons, Friday through Sunday. Baseline physical handling pattern specifies that the proper handling is opening the door four times a day with a force not exceeding 66.7 newtons. In this illustrative example, the forces exceed the threshold in the baseline physical handling three out of seven days and is less than the threshold four out of seven days. The amount of difference may not trigger a need for performing an action because the average force is not exceeding the threshold.

If a deviation is present, the process determines a set of actions to perform (step 410). The set of actions can include at least one of suggesting a replacement device, suggesting to request a maintenance for the device, suggesting a first set of changes in the physical handling of the device that increases at least one of a lifespan of the device, a second set of changes in the physical handling of the device that increases a performance of the device, determining a depreciation for the device, or other suitable actions. In other illustrative examples, a set of actions can also identify which users physically handle the device with a physical handling pattern that deviates from the baseline physical handling pattern.

The process initiates the set of actions (step 412). The process then returns to step 400. With reference again step 408, if a deviation is not present, the process also returns step 400.

Figure 5:
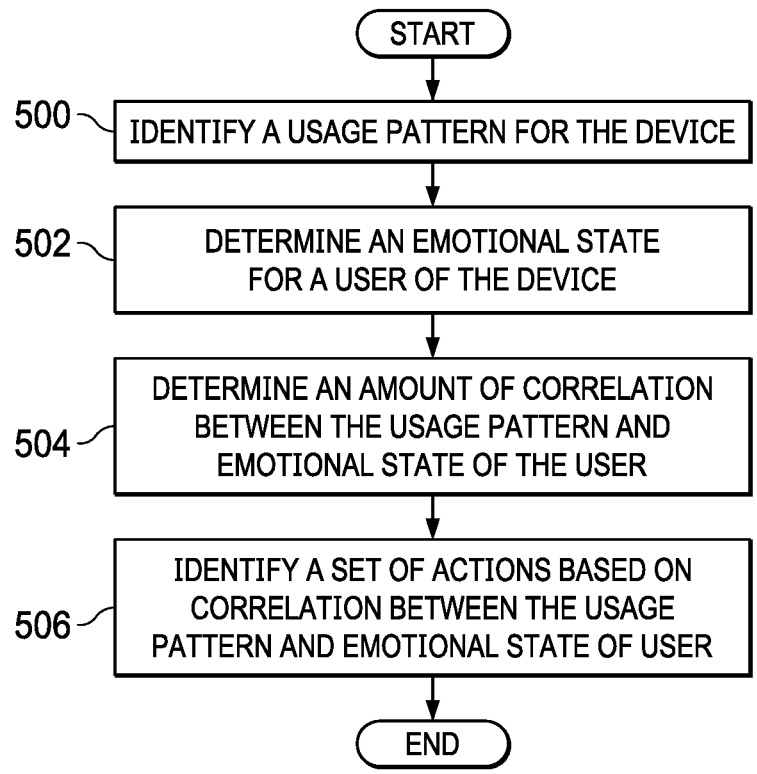
FIG. 5 is a flowchart of a process for identifying set of actions in accordance with an illustrative embodiment.

With reference now to FIG. 5, a flowchart of a process for identifying a set of actions is depicted in accordance with an illustrative embodiment. The process in this flowchart is an example of one manner in which step 410 in FIG. 4 can be implemented. This process can be initiated to perform the additional analysis when a deviation is present between the physical handling pattern and the baseline physical and pattern device. Analysis and determination is performed in this flowchart can be made by device manager 206 using artificial intelligence system 242.

The process begins by identifying a usage pattern for a device (step 500). The usage pattern can be identified using information received over time from a set of client devices that monitor the device. The usage pattern can include at least one of a frequency of use, a duration of use, a trend of use, or other suitable types of use.

The process determines an emotional state for a user of the device (step 502). In step 502, the emotional state can be determined from information relating to the device received from client devices. This emotional state can be determined at times when the device is used by the user. This emotional state can include at least one of satisfaction, happiness, contentment, frustration, dissatisfaction, displeasure, or other types of emotional states that can be relevant to the use of the device.

The information used to determine the emotional state of the user can include biometric information and other health information that is considered to be protected health information in the illustrative examples, and can be collected from devices for the users only when the users have provided consent for the collection and sharing of health information. In this illustrative example, the consent is obtained ahead of time with the proper disclosure and consent form that follow privacy rules and regulations, such as the Health Insurance Portability and Accountability Act of 1996. In the illustrative example, the health information is not collected or shared unless an occupant has opted in to share the information. Other information such as images, video data, and audio data of the user is personal and confidential information and is collected only with consent of the user to opt into this collection and usage of information.

The process determines an amount of correlation between a usage pattern and an emotional state of a user (step 504). The correlation can take a number of different forms. For example, increased dissatisfaction can be correlated with a usage pattern that shows a reduction in the usage of the device or particular portions or features in the device. In one illustrative example, with the emotional state, dissatisfaction can also be determined through the physical handling of the device.

The process identifies a set of actions based on correlation between the usage pattern and emotional state of the user (step 506). The process terminates thereafter. For example, if the correlation shows that the user is dissatisfied with the device because of an inability to use a particular feature, one action can be to provide instructions for that feature. Another action can include performing a diagnostic test to determine what features are working properly. Yet another action can include suggesting a replacement device that more closely fits the manner in which the user utilizes the device. In this manner, the physical handling of the device can be used to form additional analysis with respect to the sentiment that the user has towards the device through analyzing the usage pattern of the device by the user and the emotional state of the user when using the device.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

The following examples use case descriptions to illustrate some implementations for device management system 202 in FIG. 2. These different examples of uses are provided for purposes of describing some illustrative uses of device management system 202 and are not meant to limit the manner in which device management system 202 can be used in other illustrative examples.

Further, in the different illustrative examples, personal information such as images, video, or audio of users is considered personal or confidential and can be collected from client devices only when the users have provided consent for the collection and sharing of this information. In this illustrative example, the consent is obtained ahead of time with the proper disclosure and consent form that follow privacy rules and regulations. For example, when users rent an apartment or hotel, a request to collect this information can be made prior to check-in. This information is not collected or shared unless the users have opted in to share the information.

In a first illustrative example, device management system 202 can record physical device usage patterns for a plurality of users. These physical device usage patterns enable the recording and tracking of how different users handle devices. These physical device usage patterns can be used to determine whether particular users have mishandled devices. For example, when people share an apartment or hotel, the information can be used to determine whether any of those users have misused devices in the apartment or hotel. With this information, companies that have rental properties can determine who has damaged a device.

In another illustrative example, device manager 206 in device management system 202 enables collecting information in a manner that enables determining depreciation of a device. In this manner, the depreciation can be used to determine a value of a given item based on the physical usage patterns. Determining the depreciation can be used for at least one of tax purposes or resale. For example, a potential buyer looking at several devices can determine which device is in better condition based on the physical handling patterns and not just the model and age of the device.

As another example, a refrigerator in use for four years can be in better condition than a one-year-old refrigerator that has been physically mishandled. Physical handling patterns for the four-year-old refrigerator and for the one-year-old refrigerator can be analyzed to determine that the four-year-old refrigerator is in better condition than the one-year-old refrigerator.

In yet another illustrative example, device manager 206 in device management system 202 can manage a device such as a smart watch. In this example, a baseline physical handling pattern can be present for pressure applied by a user to enter user input on a display of the smart watch. As depicted, the manufacturer has determined that the pressure to be applied on the display to be between X newtons and Y newtons with Y newtons being the upper threshold for proper use of the display to receive user input for the smart watch.

However, the physical usage pattern detected by the smart watch is that the pressure applied to enter user input using the display the last five times was above the threshold. In this example, device manager 206 in device management system 202 determines that a deviation that has occurred a sufficient number of times to initiate a set of actions.

In this example, the set of actions can include sending a message to the user the next time the user applies pressure to the display screen that is above the threshold. The message can tell the user that the user is applying too much pressure. Further, device manager 206 can send a message to the device manufacturer with the related data to determine additional actions.

Additionally, the usage pattern and emotional state of a user can also be analyzed in conjunction with this physical handling. In this illustrative example, the emotional state of the user can be determined from information 214. Information 214 can include video data, audio data, and images of the user. Information 214 can also include biometric data, health parameters, and other information that can be used to determine the emotional state the user. This information can be obtained from devices such as a video camera, a smart watch, a smart speaker, or other suitable devices in client devices 212.

The biometric data and health parameters are considered protected health information in the illustrative examples and can be collected from devices for the users only when the users have provided consent for the collection and sharing of health information. In this illustrative example, the consent is obtained ahead of time with the proper disclosure and consent forms that follow privacy rules and regulations, such as the Health Insurance Portability and Accountability Act of 1996. In the illustrative example, health information is not collected or shared unless a user has opted in to share the information. Further, other information such as images, video data, and audio data of the user is considered personal and confidential and is collected only with consent of the user to opt into this collection and usage of information.

For example, a determination can be made by device manager 206 as to whether the user is encountering frustration using features of a smart watch. Based on the analysis, device manager 206 can run a diagnostic test on the smart watch to check the status of the main components, functions, and features. If a problem is found from the diagnostic test such as a faulty component or feature, device manager 206 can initiate additional actions such as send a replacement smart watch, send a message to the manufacturer to offer a solution to the client, and perform forensics. Further, device manager 206 can identify a feature being accessed by the user when the pressure applied is greater than the threshold. Device manager 206 can send a communication to the user to confirm whether the feature identified is not working as expected. As another illustrative example, device manager 206 can disable the feature that is not functioning properly.

In still another illustrative example, an IoT device has five features. Examples of an IoT device include a smart television, a smart refrigerator, a smart iron, a smart watch, a smart air conditioner, a smart washing machine, a surveillance camera, or other suitable devices.

Device manager 206 in device management system 202 may detect that a user normally uses four of those five features from physical handling patterns detected for the IoT device for the user. If device manager 206 detects that only two of the four features were used in the last few uses of the IoT device, the user could be a new user using the IoT device and does not have sufficient knowledge of the device. Alternatively, the other two functions may not working as expected and the user has stopped using these features.

In this illustrative example, device manager 206 initiates a set of actions. The set of actions can include running a diagnostic test on sensors. Device manager 206 can also run a diagnostic test on the features to determine whether the features are operating properly. Depending on the results, device manager 206 can initiate additional actions such as sending a replacement IoT device, or scheduling a technician for maintenance or repair.

Further, if the sensor and features are functioning properly, device manager 206 can prompt the user to determine if the reduced use of the features is because of a lack of knowledge about the features. If a lack of knowledge is present, device manager 206 sends guides to the user about the features. These guides can be, for example, a manual, a list of steps, a video lesson on using the features, or some other suitable type of guide.

Figure 6:
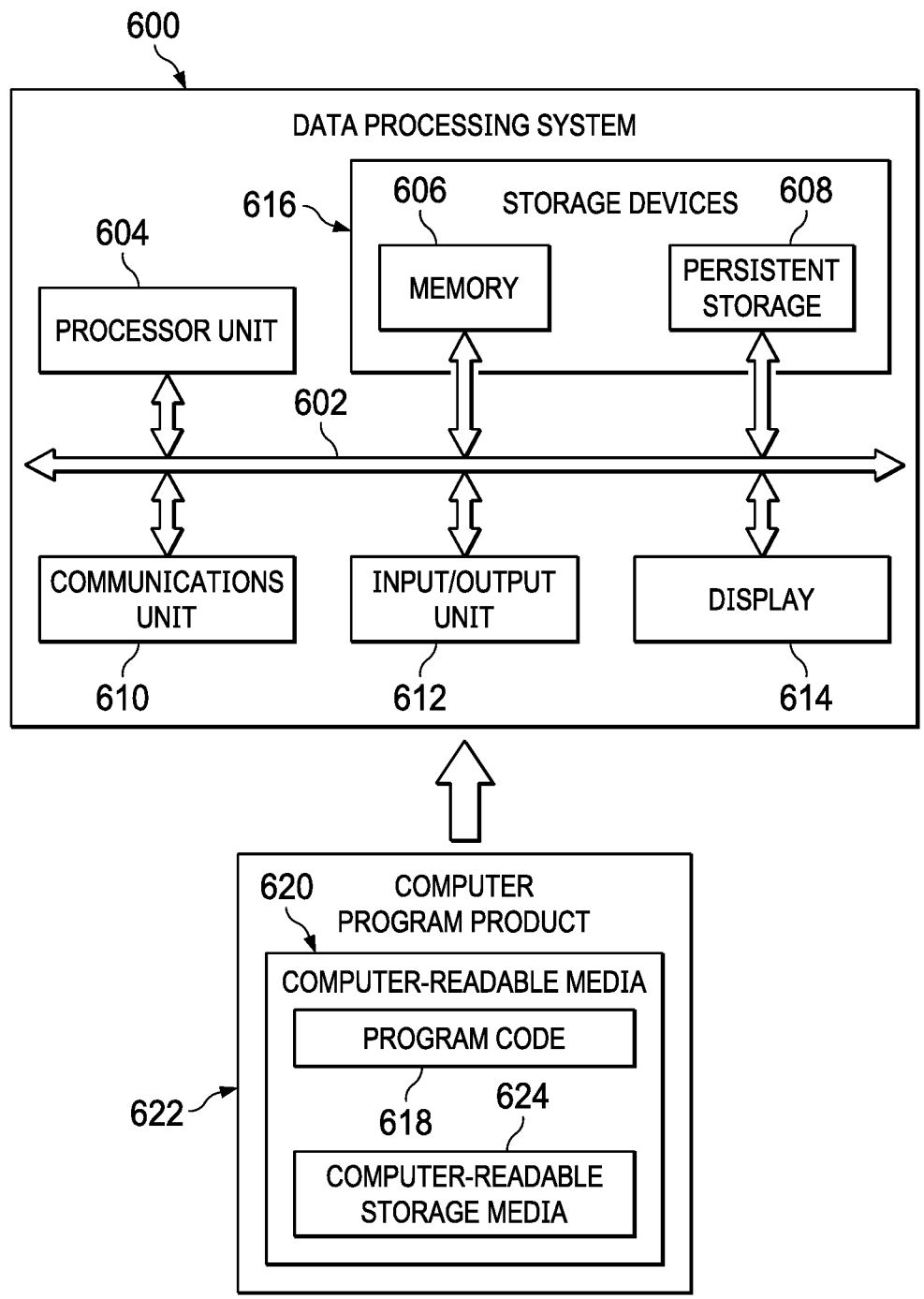
FIG. 6 is a block diagram of a data processing system in accordance with an illustrative embodiment.

Turning now to FIG. 6, a block diagram of a data processing system is depicted in accordance with an illustrative embodiment. Data processing system 600 can be used to implement server computer 104, server computer 106, client devices 110, in FIG. 1. Data processing system 600 can also be used to implement computer system 208 in FIG. 2. In this illustrative example, data processing system 600 includes communications framework 602, which provides communications between processor unit 604, memory 606, persistent storage 608, communications unit 610, input/output (I/O) unit 612, and display 614. In this example, communications framework 602 takes the form of a bus system.

Processor unit 604 serves to execute instructions for software that can be loaded into memory 606. Processor unit 604 includes one or more processors. For example, processor unit 604 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 604 can may be implemented using one or more heterogeneous processor systems in which a main processor is present with secondary processors on a single chip. As another illustrative example, processor unit 604 can be a symmetric multi-processor system containing multiple processors of the same type on a single chip.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, can be, for example, a random-access memory or any other suitable volatile or non-volatile storage device. Persistent storage 608 may take various forms, depending on the particular implementation.

For example, persistent storage 608 may contain one or more components or devices. For example, persistent storage 608 can be a hard drive, a solid-state drive (SSD), a flash memory, a rewritable optical disk, a rewritable magnetic tape, or some combination of the above. The media used by persistent storage 608 also can be removable. For example, a removable hard drive can be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that can be connected to data processing system 600. For example, input/output unit 612 may provide a connection for user input through at least one of a keyboard, a mouse, or some other suitable input device.

Further, input/output unit 612 may send output to a printer. Display 614 provides a mechanism to display information to a user.

Instructions for at least one of the operating system, applications, or programs can be located in storage devices 616, which are in communication with processor unit 604 through communications framework 602. The processes of the different embodiments can be performed by processor unit 604 using computer-implemented instructions, which may be located in a memory, such as memory 606.

These instructions are referred to as program code, computer usable program code, or computer-readable program code that can be read and executed by a processor in processor unit 604. The program code in the different embodiments can be embodied on different physical or computer-readable storage media, such as memory 606 or persistent storage 608.

Program code 618 is located in a functional form on computer-readable media 620 that is selectively removable and can be loaded onto or transferred to data processing system 600 for execution by processor unit 604. Program code 618 and computer-readable media 620 form computer program product 622 in these illustrative examples. In the illustrative example, computer-readable media 620 is computer-readable storage media 624.

In these illustrative examples, computer-readable storage media 624 is a physical or tangible storage device used to store program code 618 rather than a medium that propagates or transmits program code 618.

Alternatively, program code 618 can be transferred to data processing system 600 using a computer-readable signal media. The computer-readable signal media can be, for example, a propagated data signal containing program code 618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 600 are not meant to provide architectural limitations to the manner in which different embodiments can be implemented. In some illustrative examples, one or more of the components may be incorporated in or otherwise form a portion of, another component. For example, memory 606, or portions thereof, may be incorporated in processor unit 604 in some illustrative examples. The different illustrative embodiments can be implemented in a data processing system including components in addition to or in place of those illustrated for data processing system 600. Other components shown in FIG. 6 can be varied from the illustrative examples shown. The different embodiments can be implemented using any hardware device or system capable of running program code 618.

Thus, illustrative embodiments of the present invention provide a computer implemented method, computer system, and computer program product for managing a device. The method detects, by a computer system, a physical handling of the device to form a physical handling pattern for the device. The method determines, by the computer system, a baseline physical handling pattern for the device, wherein the baseline physical handling pattern for the device meets a set of handling metrics for the device. The method initiates, by the computer system, a set of actions in response to the physical handling pattern for the device deviating from the baseline physical handling pattern for the device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for managing a device, the method comprising:
    detecting, by a computer system, a physical handling of the device to form a physical handling pattern for the device;
    determining, by the computer system, a baseline physical handling pattern for the device, wherein the baseline physical handling pattern for the device meets a set of handling metrics for the device; and
    initiating, by the computer system, a set of actions in response to the physical handling pattern for the device deviating from the baseline physical handling pattern for the device.

2. The method of claim 1 further comprising:
    comparing, by the computer system, the physical handling pattern for the device with the baseline physical handling pattern for the device; and
    determining, by the computer system, whether the physical handling pattern for the device deviates from the baseline physical handling pattern for the device based on an amount of difference between the physical handling pattern for the device and the baseline physical handling pattern for the device.

3. The method of claim 1 further comprising:
    determining, by the computer system, the set of actions in response to the physical handling pattern for the device deviating from the baseline physical handling pattern for the device.

4. The method of claim 3, wherein determining, by the computer system, the set of actions in response to the physical handling pattern for the device deviating from the baseline physical handling pattern for the device comprises:
    determining, by the computer system, the set of actions based on an amount of difference between the physical handling pattern for the device and the baseline physical handling pattern for the device and at least one of a usage pattern for the device or an emotional state with respect to the device.

5. The method of claim 1, wherein the set of actions comprises at least one of suggesting to obtain a replacement device, suggesting to request a maintenance for the device, suggesting a first set of changes in the physical handling of the device that increases at least one of a life of the device, or a second set of changes in the physical handling of the device that increases a performance of the device.

6. The method of claim 1 further comprising:
    predicting, by the computer system, at least one of when a set of components in the device should be replaced or when the device should be replaced based on the physical handling detected for the device.

7. The method of claim 1 further comprising:
    determining, by the computer system, a condition of the device for resell based on a history of physical handling patterns for the device or a depreciation of the device based on a history of physical handling patterns for the device.

8. The method of claim 1, wherein the device is selected from a client device, a smart device, an appliance, a refrigerator, a dishwasher, a microwave, an oven, a freezer, a clothes washer, a clothes dryer, a digital photo frame, a television, a clock, a fan, a thermostat, a toaster, a game console, a mobile phone, a table computer, a laptop computer, a camera, an air conditioner, and an automobile.

9. A device management system comprising:
a computer system that detects a physical handling of a device to form a physical handling pattern for the device; determines a baseline physical handling pattern for the device, wherein the baseline physical handling pattern for the device meets handling metrics for the device; and initiates a set of actions in response to the physical handling pattern for the device deviating from the baseline physical handling pattern for the device.

10. The device management system of claim 9, wherein the computer system compares the physical handling pattern for the device with the baseline physical handling pattern for the device and determines whether the physical handling pattern for the device deviates from the baseline physical handling pattern for the device is present based on an amount of difference between the physical handling pattern for the device and the baseline physical handling pattern for the device.

11. The device management system of claim 9, wherein the computer system determines the set of actions in response to the physical handling pattern for the device deviating from the baseline physical handling pattern for the device.

12. The device management system of claim 11, wherein in determining the set of actions in response to the physical handling pattern for the device deviating from the baseline physical handling pattern for the device, the computer system determines the set of actions based on an amount of difference between the physical handling pattern for the device and the baseline physical handling pattern for the device and at least one of a usage pattern for the device or an emotional state with respect to the device.

13. The device management system of claim 9, wherein the set of actions comprises at least one of suggesting to obtain a replacement device, suggesting to request maintenance for the device, suggesting a first set of changes in the physical handling of the device that increases at least one of a life of the device or a second set of changes in the physical handling of the device that increases a performance of the device.

14. The device management system of claim 9, wherein the computer system predicts at least of when a set of components in the device should be replaced or when the device should be replaced based on the physical handling detected for the device.

15. The device management system of claim 9, wherein the computer system determines at least one of a condition of the device for resell based on a history of physical handling patterns for the device or a depreciation of the device based on a history of physical handling patterns for the device.

16. The device management system of claim 9, wherein the device is selected from a client device, a smart device, an appliance, a refrigerator, a dishwasher, a microwave, an oven, a freezer, a clothes washer, a clothes dryer, a digital photo frame, a television, a clock, a fan, a thermostat, a toaster, a game console, a mobile phone, a table computer, a laptop computer, a camera, an air conditioner, and an automobile.

17. A computer program product for managing a device, the computer program product comprising:
a computer-readable storage media;
first program code, stored on the computer-readable storage media, for detecting a physical handling of the device to form a physical handling pattern for the device;
second program code, stored on the computer-readable storage media, for determining a baseline physical handling pattern for the device, wherein the baseline physical handling pattern for the device meets handling metrics for the device; and
third program code, stored on the computer-readable storage media, for initiating a set of actions in response to the physical handling pattern for the device deviating from the baseline physical handling pattern for the device.

18. The computer program product of claim 17 further comprising:
fourth program code, stored on the computer-readable storage media, for comparing the physical handling pattern for the device with the baseline physical handling pattern for the device; and
fifth program code, stored on the computer-readable storage media, for determining whether the physical handling pattern for the device deviates from the baseline physical handling pattern for the device is present based on an amount of difference between the physical handling pattern for the device and the baseline physical handling pattern for the device.

19. The computer program product of claim 17 further comprising:
fourth program code, stored on the computer-readable storage media, for determining the set of actions in response to the physical handling pattern for the device deviating from the baseline physical handling pattern for the device.

20. The computer program product of claim 19, wherein the fourth program code comprises:
program code, stored on the computer-readable storage media, for determining the set of actions based on an amount of difference between the physical handling pattern for the device and the baseline physical handling pattern for the device and at least one of a usage pattern for the device or an emotional state with respect to the device.

* * * * *